United States Patent [19]
Johnson

[11] 3,890,289
[45] June 17, 1975

[54] AUTOMATIC SCUM REMOVAL TROUGH

[75] Inventor: Paul R. Johnson, Mineral Wells, Tex.

[73] Assignee: Harsco Corporation, Harrisburg, Pa.

[22] Filed: July 15, 1974

[21] Appl. No.: 488,422

[52] U.S. Cl. ................ 210/104; 210/143; 210/523
[51] Int. Cl. ............................................ B01d 21/24
[58] Field of Search ............ 210/104, 122, 523, 525

[56] References Cited
UNITED STATES PATENTS

| | | | |
|---|---|---|---|
| 2,348,938 | 5/1944 | Stahl et al. | 210/122 X |
| 2,671,562 | 3/1954 | Bingman | 210/523 X |
| 3,081,879 | 3/1963 | Schrorach et al. | 210/523 |

*Primary Examiner* — John Adee
*Attorney, Agent, or Firm* — Cameron, Kerkam, Sutton, Stowell & Stowell

[57] ABSTRACT

An automatic scum removal trough to remove floating material from a clarifying tank of a sanitary disposal system. A skimmer activates a limit switch to energize a motor to tilt the trough toward a pickup position. An electrode, mounted on the trough engages liquid in the tank to de-energize the motor to stop the trough at the selected level. When the skimmer has completed a cycle through the tank and started back to original position another limit switch is actuated to energize the motor for reverse rotation to return the trough to an upright position.

The skimmer is lifted out of the liquid upon reverse movement to prevent movement of scum back toward the opposite end of the tank from the trough.

12 Claims, 6 Drawing Figures

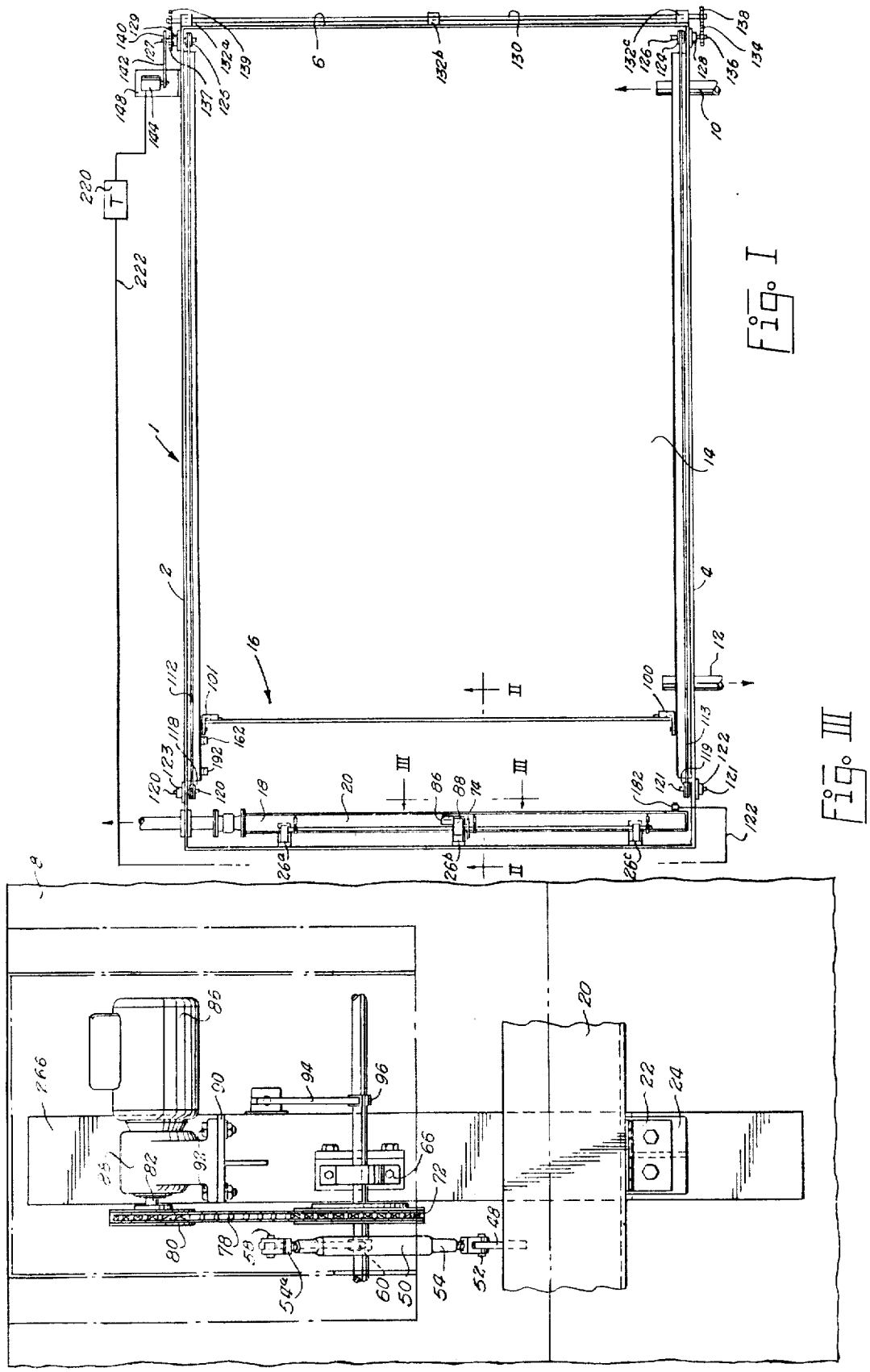

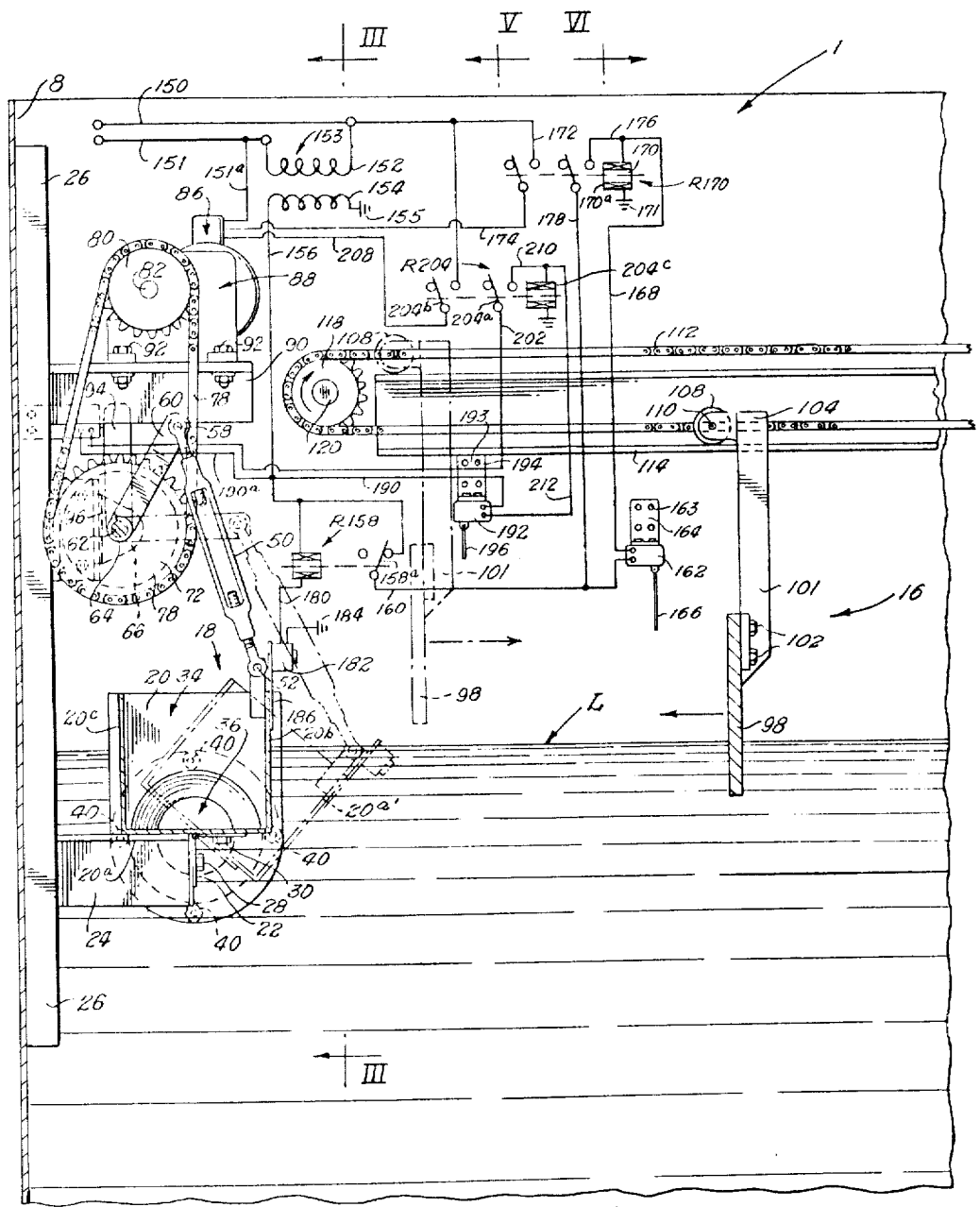
Fig. II
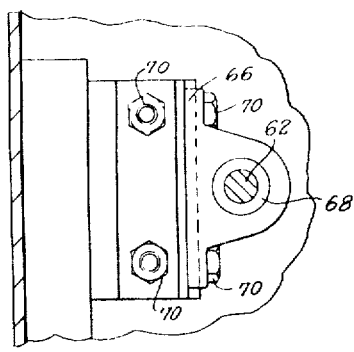
Fig. IV

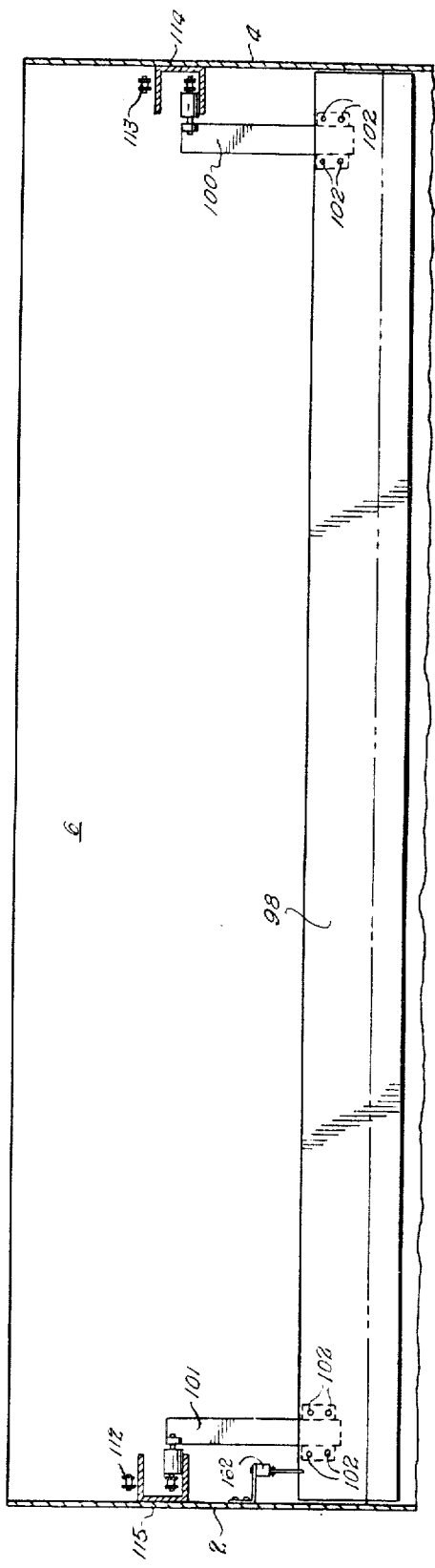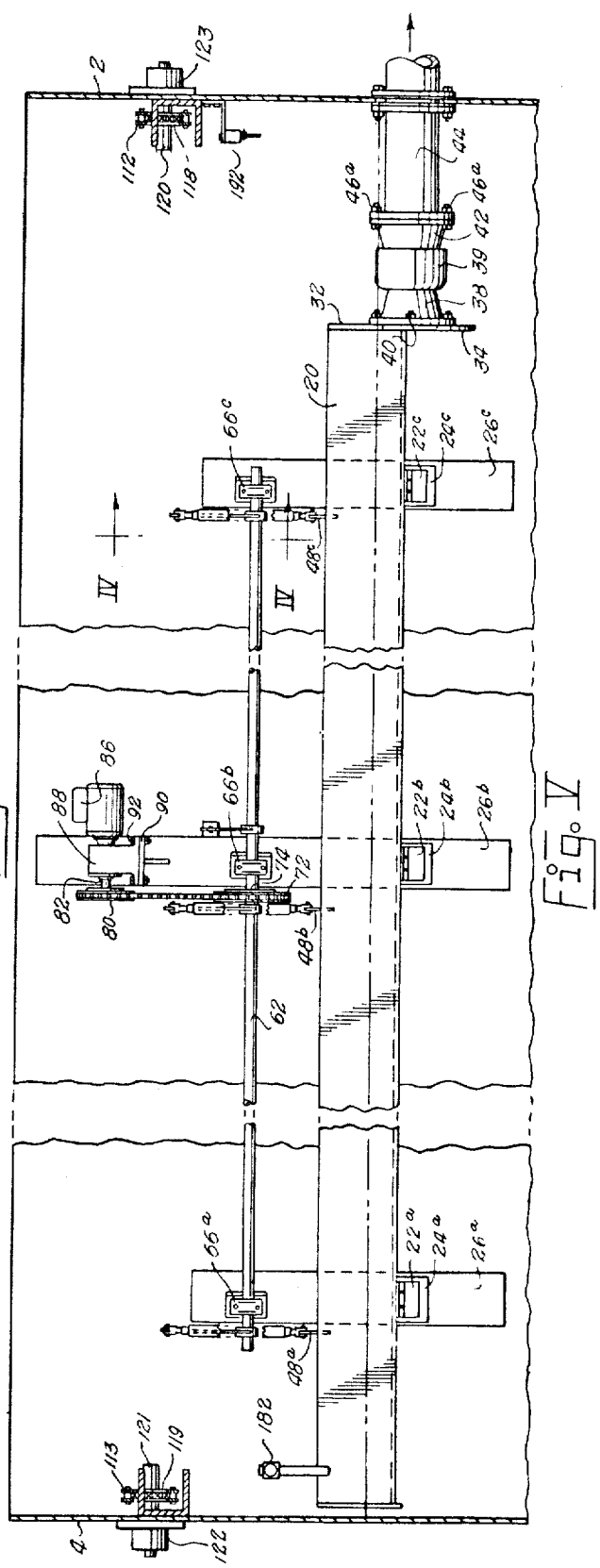

AUTOMATIC SCUM REMOVAL TROUGH

BACKGROUND OF INVENTION

Sewage treatment processes involve the decomposition of liquid sewage by biological oxidation and the reduction of sewage solids by aerobic digestion. During the treatment process scum forms on the surface of liquid in clarifier tanks and must be removed periodically.

Scum removal apparatus heretofore devised has not efficiently regulated the overflow rate of liquid from clarifier tanks into scum collection systems when the liquid level in the clarifier tank varies with fluctuation in flow rate of influent.

When scum is moved by the hydraulic head created by submerging the edge of a collection trough below the surface of liquid, it is necessary that the edge of the trough be positioned at a precise level below the surface of the liquid to assure scum removal and yet limit loss of more partially treated liquid than is required to convey scum.

Systems heretofore employed in an attempt to solve the problem have used very expensive and complicated means; thus, requiring expensive maintenance programs and large investments for the disposal systems.

Because of the complicated machinery a high degree of technology has been required to operate and oversee the machinery that has heretofore been used. In addition to the expense involved in the repair of such machines, the delay in use of such machines due to breakdowns has been a major problem.

SUMMARY OF INVENTION

I have devised an improved automatic pivoted scum collection trough assembly for removal of solid wastes from clarifying tanks. As a skimmer moves across the surface of the fluid and moves the scum toward the collection trough it engages a limit switch to activate a motor which through appropriate drive means tilts the trough in a downward direction toward the water. An electrode attached to the trough is activated upon contact with the water and stops the motor and drive means to position the trough in the correct position to take in the least amount of water and the maximum amount of flock off of the surface of the liquid clarifying tank. As the skimmer returns to its original position it engages another limit switch which energizes the tilt motor to tilt the trough to an upright position. In the upward level position the solid and semi-solid waste are drained off.

A primary object of the invention is to position the edge of the trough in the proper position to trap the greatest amount of waste while taking in the minimum amount of water.

Another object of the invention is to provide a simple and maintenance-free system eliminating expensive cost of repair to the system.

A further object is to provide an inexpensive means of removal of scum off the surface of liquid in a sewage clarifying tank.

A further object is to provide a method which can remove the scum from the clarifying tank at various water levels which are called for because of the input of the sewage system.

A further object of the invention is to provide a system which is fully automated and requires minimum personnel to operate it.

A still further object of the invention is to provide a system for all populous areas because of its inexpensive cost of operation and maintenance.

Other and further objects of the invention will become apparent by referring to the detailed description hereinafter following and to the drawings annexed hereto.

DESCRIPTION OF DRAWING

Drawings of a preferred embodiment of my invention are annexed hereto so that the invention may be better and more fully understood, in which:

FIG. 1 shows a top view of a typical clarifying tank with the scum removal trough at one end of the tank;

FIG. 2 shows an elevation of the trough from a cross-sectional view of FIG. 1 taken along lines 2—2;

FIG. 3 shows a frontal elevation taken along lines 3—3 of FIG. 1;

FIG. 4 shows the embodiment of the pillow-block for mounting the drive shaft for the scum trough taken along the lines 4—4 of FIG. 5;

FIG. 5 is a frontal elevation showing the construction of the trough and drive means connected to the collecting pipe taken along lines 5—5 of FIG. 1; and FIG. 6 is a frontal view taken along lines 6—6 showing the operation and construction of the skimmer blade.

Numeral references are employed to designate parts in the drawings and like numerals indicate like parts throughout the various figures of the drawing.

DESCRIPTION OF A PREFERRED EMBODIMENT

Referring to the drawing detail the numeral 1 in FIG. 1 of the drawing generally designates the typical clarifying tank, but is by no means limited to the rectangular structure as the remover may be used in circular clarifying tanks as well as other shapes.

The clarifying tank 1 has side walls 2 and 4 running in a longitudinal direction connected by end wall 6 and 8, and has a bottom 14.

Generally an input conduit 10 is provided for allowing liquid sewage influent into the tank, and an output conduit 12 is provided for taking away water which has been clarified in the tank 1. In addition thereto a skimmer mechanism 16 is mounted to move longitudinally along the surface of the fluid in clarifying to push the solid and semi-solid material that floats to the top toward the trough means 18. The trough means 18 is located laterally at one end 8 of the tank toward which the skimmer means 16 moves in order to receive and trap such scum and dispose of it. The skimmer means 16 and trough 18 will be hereinafter described in more detail.

Generally the clarifying tank 1 is filled through input conduit 10. Chemicals are placed in the tank 1 to provide means to cause the solid and semi-solid waste to float to the top which is called scum. The scum is then skimmed off the top of the liquid by skimmer means 16 into trough means 18 from which it may be removed. The clarified water is removed through output conduit 12.

The trough means 18 preferably consists of a scum trough 20 which extends the width of the clarifying tank 1. The scum trough 20 may be of any suitable shape but is shown in this embodiment as being rectangularly shaped trough, dimensions of which are such as to allow maximum efficiency in the pickup of the scum according to the needs of that sanitary system. The illustrated trough comprises a bottom wall 20a having upwardly extending front and rear sidewalls 20b and 20c respectively. As will be hereinafter described, electrode 182 is positioned to sense the position of the edge 20a' relative to the water surface.

The scum trough 20 is connected by means of three hinges 22a, 22b and 22c as is more clearly illustrated in FIG. 5, such hinges being a folding type with a pin on the butt edge of the hinge. Such hinge 22 is connected to a support member 24 at 24a, 24b, and 24c as is clearly illustrated in FIG. 5.

The hinges are rigidedly connected to support member 24 by means such as bolts and nuts 28 as shown in the preferred embodiment of FIG. 2. The trough 20 is hinged on the edge of support member 24 in such a way as to allow trough 20 to tilt forward and into the water as shown in broken lines in FIG. 2. The stationary leaf of hinge 22 is fastened rigidly to the bottom of the trough 20 by means such as bolts and nuts 30, as shown in FIG. 2. Such support member 24 is rigidly connected to connecting blocks 26 at 26a, 26b, and 26c respectively to which the entire trough assembly is rigidly connected to wall 8 of the clarifying tank 1 as shown in FIG. 5.

As shown in FIG. 5 on the drain end 32 of the trough 20, end plate 34 extends below the trough 20 to allow means to fasten to the drain pipe 44 thereto. Such end plate 34 has a passage 36 (FIG. 2) located in such a way as to allow drainage from the trough 20, being on the bottom side of trough 20 preferably in the center of the trough end 34. The passage 36 is located in such a way that when trough 20 pivots upwardly it allows the drain pipe to be in a lower position than the trough thereby allowing the fluid to flow downward and out. A pivot coupling 38 is rigidly attached to end plate 34 by means such as bolts 40, and one-half of the pivot coupling 38 extends below the bottom of the trough 20. To allow it to rotate the pivot coupling 38 extends into a swivel 39 which allows rotation about an axis running through the coupling 38, swivel 39, and another tapered coupling 42 which is rigidly attached to the output pipe 44. The swivel 39 forms a seal about the pivot coupling 38 and the coupling 42, allowing passage of liquid therethrough without leakage. The coupling 42 is rigidly attached to output pipe 44 by means such as bolts 46. The output pipe 44 flows into conventional sewage disposal means of the sanitary system.

The pivotal movement of trough 20 is controlled by suspension means extending from support brackets 48 secured to the trough, as best seen in FIG. 5 which are indicated at 48a, 48b, and 48c. Such support brackets 48 are rigidly attached to trough 20 by means such as welding or bolts. The brackets 48 are pivotally connected to lever arm 60 by means such as turn buckles which are attached to trough 20 by means such as welding or bolts. The brackets 48 are pivotally connected to lever arm 60 by means such as turn buckles which are attached to support brackets 48 by means of pivot pins 52 and to arm 60 by pivot pin 58 to form pivot points about pins 52 and 58. The turn buckles 50 permit adjustment of the distance between the end of lever arm 60 and support bracket 48 for adjusting the tilting movement of trough 20. Thereby turn buckles 50 move universally downwardly and upwardly as trough 20 tilts.

Lever arms 60a, 60b, and 60c are rigidly attached to shaft 62 by means such as set screw 64.

Shaft 62 is supported by pillow blocks 66a, 66b, and 66c, as best illustrated in FIGS. 4 and 5, which are rigidly attached to connecting members 26a, 26b, and 26c respectively which are secured to the tank wall. The typical pillow blocks 66 shown in FIG. 4 includes a press bearing 68 which allows movement of shaft 62 within it. The pillow block 66 is rigidly attached to connecting block 26 by means such as bolts 70.

Shaft 62 is rotatably by means such as sprocket 72 rigidly attached to the shaft 62 by means such as key pin 76 near connecting block 26 on the shaft which can best be seen in FIG. 1. Sprocket 72 is driven by means such as a sprocket chain 78. Chain 78 is driven by a sprocket 80 of a smaller dimension than sprocket 72 in order to allow proper speed control. Sprocket 80 is rigidly attached to shaft 82 by means such as set screw 84. Shaft 82 is driven by an electric motor 86 through a gear reduction transmission 88 which reduces the speed of the sprocket 80 to the proper level. Transmission 88 is secured to support member 90 by bolts 92. Support member 90 is welded or otherwise rigidly secured to connecting block 26b, as shown in FIG. 3. Lever arm 94 is a bar extending from and rigidly attached to shaft 62 by set screw 96 to rotate with shaft 62 for actuating a limit switch 200 which will be hereinafter more fully described.

Skimmer means 16 comprises a skimmer blade 98 extending laterally through the tank 1 between sides 2 and 4. Blade 98 is supported by support arms 100 and 101 which are rigidly attached to skimmer blade 98 by means such as bolts 102a and 102b as best illustrated in FIG. 2. The support arms 100 and 101 are pivotally attached by pins 106 to L-shaped arms 104 which are rotatably secured to rollers 108 by means of a key 110. Rollers 108 are supported by flanges of C-channels 114 and 115 at each side of the tank.

Drive chains 112 and 113 extend about sprockets 118 and 119 mounted on stub shafts 120 and 121 secured to sides 2 and 4 of the tank by pillow blocks 122 and 123. Spaced links of chains 118 and 119 are pivotally secured to L-shaped arms 104 to direct rollers 108 along lower flanges of channel members 114 and 115, about sprockets 118 and 119, along upper flanges of channel members 114 and 115, and downwardly about sprockets 124 and 125.

Sprockets 124 and 125 are mounted on stub shafts 126 and 127 which extend through bearings 128 and 129 secured to sidewalls 2 and 4 of the tank 1 adjacent end 6. Stub shaft 126 has a gear 136 secured thereto having teeth meshing with teeth on gear 138 rigidly attached to a shaft 130 rotatably supported by bearings 132a, 132b and 132c attached to end wall 6. A gear 139 is secured to shaft 130 and has teeth meshing with teeth of gear 137 which is rigidly fastened to stub shaft 127.

It should be readily apparent that rotation of stub shaft 127, carry gear 137, imparts rotation to stub shaft 126 through gear 139, shaft 130, gear 138 and gear 136.

A drive sprocket 140 on stub shaft 127 is driven by a motor 144 and sprocket 146 through a chain 142 to move the blade 98 longitudinally of the trough 1.

The scum removal means 16 is controlled by an electrically actuated signal generating apparatus as diagrammatically illustrated in FIG. 2.

A transformer 153 comprises a primary coil 152, connected to any suitable source of electricity such as power lines 150 and 151, and a secondary 154 one side of which is grounded at 155 and the other side of which is connected to line 156. Line 156 continues to a relay 158 which is illustrated in normally closed position. Line 160 extends on the other side of relay 158 to contact limit switch 162 which is rigidly attached to sidewall 2 by means such as bolts 163 and a bracket 164. Contact limit switch 162 is normally in the open position and activated by an extending contact arm 166 which extends downward in such a position as to come in contact with skimmer blade 98 as it travels along its longitudinal path in the clarifying tank 1. Arm 166, when contacted, will close switch 162, sending a signal down line 168 to a relay coil 170. Relay coil 170 is grounded at 171 on the opposite side. Relay 170 consists of two normally open switches 170b and 170c which are connected by suitable means to a solenoid 170a. Switch 170c is connected to line voltage 150 by means of line 172 and extends onward by means of line 174 to the motor 86.

A holding circuit is provided in order to hold the relay 170 closed by means of line 176 connected line 168 extending through normally open switch 170b and connected by line 178 to line 160.

Relay 170 may be activated by relay 158 being activated. Line 180 connects relay 158 to electrode 182 which is connected to trough 20 by means of holding bracket 186 at end 32 of the trough 20. The electrode 182 is grounded at 184. The electrode 182 is a conventional device which when wet closes a circuit therein which will activate relay 158 to break the circuit which energizes the motor 86 in a forward position, thereby stopping the motor 86.

Line 190 is connected to line 156 which extends to switch 192 which is rigidly attached to wall 2 by means of a bracket 193 and bolts 194 in such a position that skimmer blade 98 will activate it on the return trip, which will be hereinafter described in operations. Such switch 192 has an extendor arm 196 thereon which is contacted by skimmer blade 98 on the return trip to close the normally open switch therein. Line 190a extends to limit switch 200 which is spring urged to a normally closed position. Limit switch 200 is actuated upon engagement by lever arm 94 on shaft 62 when it comes into proper position to open said switch 200. Line 202 extends from switch 200 to the pole of switch 204a of relay 204.

Relay 204 comprises a relay coil 204c and two switches 204a and 204b. Line 206 extends from power line 150 to a normally open contact of switch 204b while the pole is connected through line 208 to the motor 86 to provide the reverse rotation of motor 86. Line 210 extends from coil 204c to a normally open contact of switch 204a while the pole of switch 204a is connected through line 202 to switch 200. Line 212 extends between coil 204c and microswitch 192. Thus, when switch 192 is momentarily closed the coil 204c is energized and a holding circuit through lines 210 and 202, switch 200, line 190a and line 156 is completed by switch 204a to continue activation of relay 204 until the circuit is broken by opening switch 200.

The motor 86 preferably has two windings, one of which is connected to line 174 causing a forward direction of rotation when switch 170c is closed. The other winding of motor 86 is connected to line 208 to cause a reverse or opposite direction of rotation to reverse the pivotal movement of the trough when switch 204b is closed. Each of the windings are connected through line 151a to power line 151.

Drive motor 144 for the skimmer 16 is connected to a timer 220 by means of line 221 which timer will drive the motor at sequences of time. Timer 220 is connected by means of line 222 to electrode 182 such that when the sequence of operation has been started, if timer 220 were to shut off, the circuit would be completed until the sequence is finished, because of a closed circuit provided by electrode 182. Although a timer 220 is employed in the preferred embodiment in FIG. 1 it is by no means limited thereto, as a manual operation may be used.

OPERATION

Motor 144 may be activated by any means, such as timer 220, in order to drive the shaft 130 which controls the movement of chains 112 and 113, said chains being arranged to move skimmer means 16 and blade 98 thereof to keep a continuous parallel operation of skimmer blade 98 as it moves longitudinally toward the end 8 of the clarifying tank 1. As skimmer blade 98 is moved along the channels 114 by chain 112, it will strike extendor arm 166 of switch 162, thereby closing the normally open switch 162.

Switch 162, is thus closed and will activate relay 170 by means of electrical impulse and close normally open switches 170b and 170c. Switch 170c, when closed, will provide the completed circuit to lines 172 and 174 to activate the first direction of rotation of the motor 86. Switch 170b, when closed will continue to activate the relay 170 by means of the holding circuit through lines 176 and 178.

The motor 86, being activated to rotate in a first direction, will turn the gears 80 and 72 in the first direction. This will turn shaft 62 in the first direction and lever arms 60 in the first direction. Lever arms 60 will move turnbuckles 50 which are connected to supporting bracket 48 connected to trough 20 downward thereby moving the front of trough 20 in a downward direction toward the water therein. Trough 20 will move downward until such time as the electrode 182 makes contact with the liquid, thereby closing the circuit in the electrode. This submerges the front of trough 20 at the selected level below the surface of the liquid to skim the scum off the top of the water without wasting an excessive amount of water.

The electrode 182, when in a downward position, closes the circuit which extends along line 180 to relay 158. Switch 158a of relay 158 is in a normally closed position. When the relay 158 is activated switch 158a therein is opened, causing the holding circuit to switch 170b of relay 170 to open. By opening the holding circuit of relay 170 such inactivates the relay 170 and opens all switches including switch 170c controlling the motor 86, thereby creating a stopping position for motor 86. The stopping position of edge 20a' of the trough will vary in accordance with the level L of the surface of liquid in tank 1.

The trough 20 remains in the downward position as the skimmer blade moves toward same, pushing the flock and scum into the trough 20. As the skimmer blade 98 moves upwardly sprockets 118 and 119 which support it. Sprockets 118 and 119 carry L-shaped arms 104 upwardly to a point where rollers 108 engage the upper flanges of the C-channel 114 where roller 108 will support it for return to the other end of the tank, the skimmer blade 98 being elevated out of the liquid on its return movement. This prevents movement of scum back toward the end of the tank 6 upon return movement of the blade. As skimmer blade 98 moves in a rearward direction toward end 6 on top of channel 114 it again strikes the extendor arm 196 of limit switch 192.

When the extendor arm 196 is struck the normally open switch 192 is closed thereby actuating relay 204 closing normally open switch 204a completing a holding circuit through line 210 to coil 204c. In addition it closes normally open switch 204b which completes a circuit through line 208 to activate the motor in second direction. Motor 86 reverses moving sprockets 80 and 72 in a counter-clockwise direction, as viewed in FIG. 2, sending the lever arm 60 in a counter-clockwise direction and pulling trough 20 by means of turnbuckle 50 and connecting bracket 48 to the upward position.

As the trough 20 is moved upward the lever arm 94 simultaneously moves in a counter-clockwise direction until when the trough 20 is in the full upright position lever arm 94 strikes switch 200, which is in a normally closed position, but when struck by lever arm 94 is opened, thereby opening the holding circuit to relay 204, breaking the circuit and opening relay 204, opening all circuits thereto. This stops the motor 86, which prepares it for the next cycle. Skimmer blade 98 moves in its raised position back toward the back wall 6 of the tank until it is activated again by means such as a timer 220 which is seen in FIG. 1. The electronic circuits are best illustrated in FIG. 2.

As trough 20 is in an upward position now the scum floats downward toward passage 36 and flows out through coupler 38, swivel 39, coupler 42 and discharge pipe 44. The scum flows from pipe 44 into another section of the sanitary disposal plant.

The above described cycle is repeated in the manner hereinbefore described when timer 220 initiates another cycle.

Having described my invention, I claim:

1. Apparatus to remove floating scum from the surface of liquid in a tank comprising: a trough having side walls; support means in the tank secured to the trough, said support means being adapted to permit vertical movement of an edge of one of the sidewalls of the trough; drive means; connector means secured between the drive means and the trough; means to energize said drive means to initiate movement of the edge of the trough in a first direction; liquid sensor means on said trough arranged to de-energize said drive means upon movement of the edge of the trough a predetermined distance below the surface of the liquid in the tank; and means to energize said drive means to initiate movement of the edge of the trough in a second direction.

2. The combination called for in claim 1 with the addition of: means to remove liquid from said trough.

3. The combination called for in claim 2 wherein the support means comprises: means to pivotally secure said trough in the tank, said trough being rotatable about an axis extending longitudinally of said trough.

4. The combination called for in claim 3 wherein the trough comprises: spaced side walls; a bottom secured between said side walls; and end walls secured to said side walls and said bottom, one of said end walls having a passage extending therethrough.

5. The combination called for in claim 4 wherein the means to remove liquid from said trough comprises: a drain-line leading from the tank; conduit means secured to said trough about said passage in the end wall; and swivel means securing said drain-line to said conduit means, said swivel means having an axis coinciding with the axis about which the trough is rotatable.

6. The combination called for in claim 1 wherein the drive means comprises: a motor driven sprocket; a shaft; means to rotatably secure said shaft to the tank; a second sprocket on said shaft; and a chain engaging the driven sprocket and the second sprocket; said connector means being secured to said shaft and to said trough.

7. The combination called for in claim 6 wherein the connector means comprises: an arm secured to said shaft; a link; and means pivotally securing a first end of said link to said arm and a second end of said link to said trough.

8. The combination called for in claim 7 wherein, the link comprises: threaded means the length of which is adjustable.

9. The combination called for in claim 1 wherein, said means to energize the drive means comprises: electrical latching circuit to hold said drive means energized to move the edge of the trough in a first direction; and a skimmer actuated switch in said electrical latching circuit mounted on the tank.

10. The combination called for in claim 9 wherein, the liquid sensor means to de-energize the drive means comprises: means to open said latching circuit upon movement of the edge of the trough a predetermined distance below the surface of the liquid.

11. Apparatus to remove floating scum moved along the surface of liquid in a tank by a skimmer comprising: a trough having side walls, a bottom wall and end walls; support means in the tank secured to the trough, said support means being adapted to permit rotational movement of an edge of one of the sidewalls of the trough about an axis extending longitudinally of the trough; drive means; connector means secured between the drive means and the trough; a skimmer actuated switch in a latching circuit to energize said drive means to initiate rotational movement of the edge of the trough in a first direction; liquid sensor means on said trough arranged to de-energize said drive means upon movement of the edge of the trough a predetermined distance below the surface of the liquid in the tank; and means to energize said drive means to initiate rotational movement of the edge of the trough in a second direction.

12. The combination called for in claim 11 wherein, the liquid sensor means to de-energize the drive means comprises: switch means in said latching circuit to open said latching circuit upon movement of the edge of the trough a predetermined distance below the surface of the liquid.

* * * * *